F. TAYLOR.

COAT AND HAT HOOK.

No. 11,416.

Reissued Apr. 24, 1894.

WITNESSES:

A. D. Harrison

W. F. McLord

INVENTOR:

F. Taylor by Wright Brown & Quinby

Attys.

THE NATIONAL LITHOGRAPHING COMPANY,
WASHINGTON, D. C.

UNITED STATES PATENT OFFICE.

FREDERICK TAYLOR, OF LOWELL, MASSACHUSETTS.

COAT AND HAT HOOK.

SPECIFICATION forming part of Reissued Letters Patent No. 11,416, dated April 24, 1894.

Original No. 499,609, dated June 13, 1893. Application for reissue filed November 25, 1893. Serial No. 491,998.

*To all whom it may concern:*

Be it known that I, FREDERICK TAYLOR, of Lowell, in the county of Middlesex and State of Massachusetts, have invented certain new and useful Improvements in Coat and Hat Hooks, of which the following is a specification.

This invention relates to hat and coat hooks made of wire and it consists in a hook comprising a loop-shaped hat-hook and two independent loop-shaped coat-hooks all made from a single piece of wire, two of the members of the coat-hooks being interlocked with the other two members thereof at points below the inner end of the hat-hook in such manner as to prevent sagging of the hat-hook when the device is secured to a wall or other support, as I will now proceed to describe.

Figure 1:
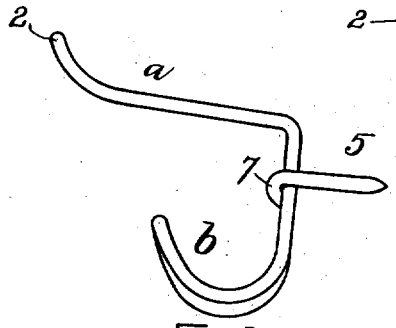
Figure 2:
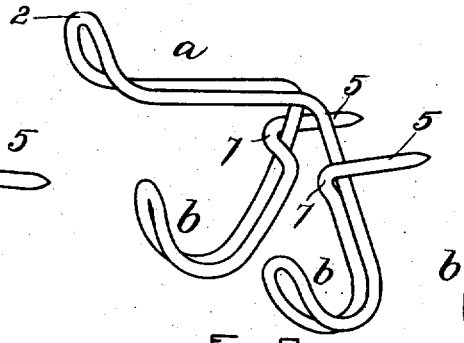
Figure 3:
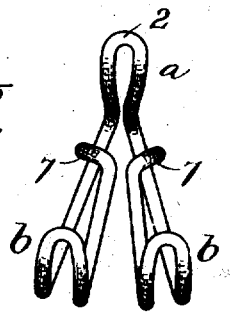
Figure 4:
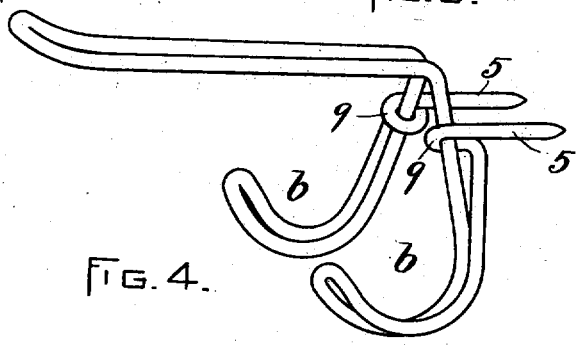
Figure 5:
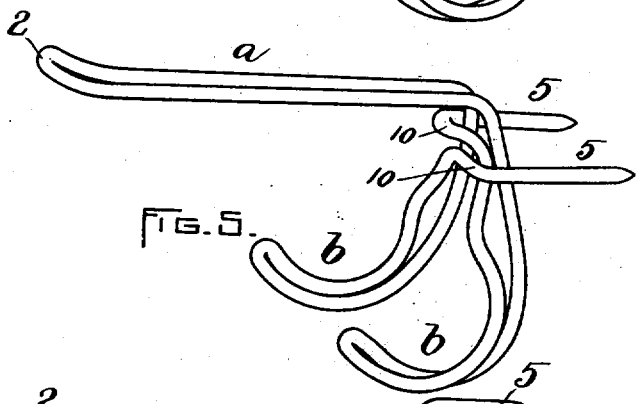
Figure 6:
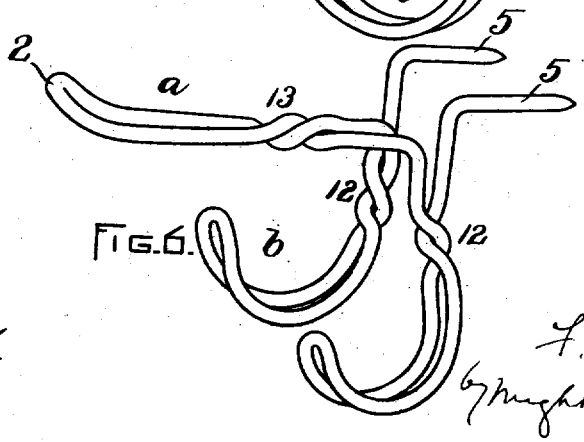

Of the accompanying drawings—Figure 1 represents a side elevation of my improved hook. Fig. 2 represents a front elevation. Fig. 3 represents a perspective view. Figs. 4, 5 and 6 represent perspective views of other modifications.

The same letters and numerals of reference indicate the same parts in all the figures.

In the drawings—*a* represents a loop-shaped hat-hook, the members of which are arranged so that at any cross-section of the hook they are in substantially the same horizontal plane and present two arms or bearings, or in other words a broad bearing surface, to the article supported by the hook. Said members are connected at the outer end of the hook by a neck 2.

*b b* represent loop-shaped coat-hooks which are located side by side below the hat-hook, and are made by bending the continuations of the members of the hat-hook so as to form two hooks which diverge from each other so that the garments on one hook will not interfere with those on the other. The members of the hooks *b b* are also arranged so that said hooks present broad bearing surfaces. A single piece of wire is used in making said hooks, said piece being first bent back on itself at the center of its length to form the neck 2 and two arms connected by said neck. After the hooks have been formed, the free ends of the wire are bent to form the rearwardly projecting attaching spurs 5 5, which are continuations of two of the members of the hooks *b b*. In bending the wire to form said spurs, I interlock the members on which the spurs are formed with the other two members of the hooks *b b* in such manner that when the spurs are driven into a wall or other support, the inner ends of the members of the hat-hook will be firmly supported in such manner as to prevent sagging of the inner end of the hat-hook. In Figs. 1, 2 and 3 I have shown the spurs formed as continuations of the inner members of the hooks *b b*, the wire being bent outwardly to form loops 7 7 crossing the outer members of the said hooks, the spurs bearing against the outer sides and the loops against the front sides of said members. Hence outward or lateral bending of the outer members of the hooks *b b* and of the inner ends of the members of the hook *a* is prevented by the spurs.

In Fig. 4, I show the outer members of the hooks *b b* carried in the form of loops 9 9 around the inner members of said hooks and the spurs 5 5 extending back from said loops.

In Fig. 5 the outer members of the hooks *b b* are shown as bent laterally to form arms 10 10, each arm extending across the inner member of the hook on which it is formed and across both members of the other hook *b*. The spurs 5 5 are continuations of the arms 10 10.

In Fig. 6, I show the members of each hook *b* intertwisted at 12, one member of each hook *b* being extended above the twisted portion and bent backwardly to form the spurs 5 5 which in this case are located above the inner end of the hat-hook. The members of the hat-hook are also shown intertwisted at 12.

It will be seen that in each of the constructions shown and described, the members of the coat-hooks are interlocked below the hat-hook in such manner that the inner end of the hat-hook is prevented from sagging and the members thereof are prevented from lateral separation.

I claim—

1. A hat and coat hook comprising a loop-shaped hat-hook and two independent loop-shaped coat-hooks all made from a single piece of wire, two of the members of the coat-hook being interlocked with the other two members thereof at points below the inner end of the hat-hook, such interlocking of the members serving to prevent sagging of the hat-hook when the device is secured to a wall or other support.

2. A hat and coat hook composed of a single piece of wire, comprising a loop-shaped hat-hook, two diverging loop-shaped coat-hooks located side by side below the inner end of the hat-hook, and two attaching devices formed on two of the members of the coat-hooks, the members of the coat-hooks being interlocked at points below the inner end of the hat-hook, whereby sagging of the inner portion of the hat-hook is prevented, as set forth.

3. A hat and coat hook composed of a single piece of wire, comprising a loop-shaped hat-hook, the members of which are relatively arranged as described to present a broad bearing, two diverging loop-shaped coat-hooks located side by side below the inner end of the hat-hook, and each having its members arranged to present a broad bearing and two attaching devices formed on two of the members of the coat-hooks, the members of the coat-hooks being interlocked at points below the inner end of the hat-hook, whereby sagging of the inner portion of the hat-hook is prevented, as set forth.

In testimony whereof I have signed my name to this specification, in the presence of two subscribing witnesses, this 18th day of November, A. D. 1893.

FREDERICK TAYLOR.

Witnesses:
A. D HARRISON,
F. PARKER DAVIS.